United States Patent Office 3,316,960
Patented May 2, 1967

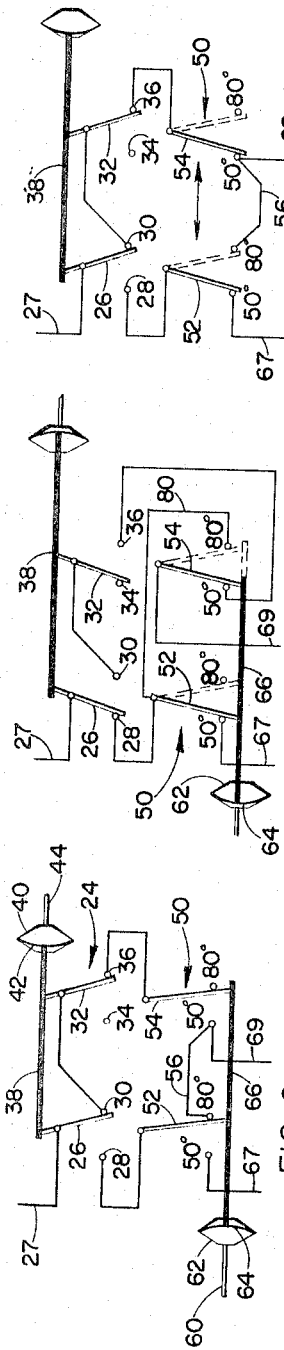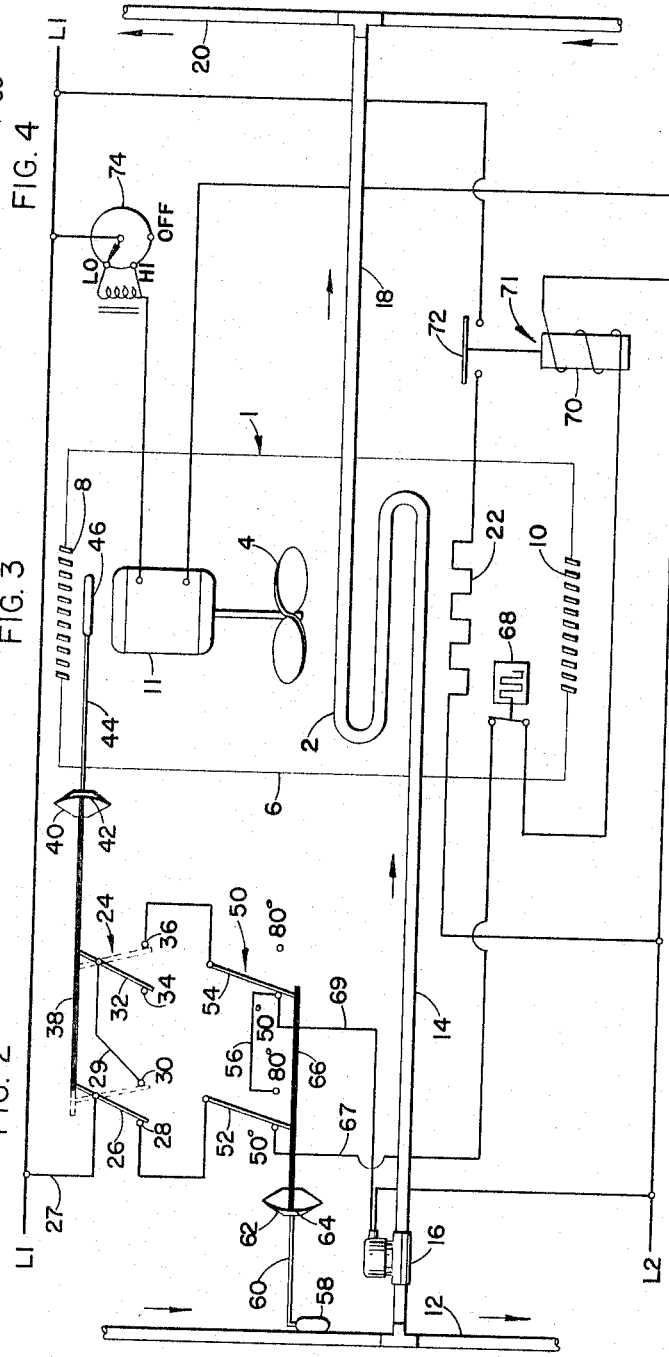

3,316,960
CONTROL CIRCUIT FOR HEAT EXCHANGE UNIT WITH AUXILIARY ELECTRIC HEATER
Robert G. Miner, La Crosse, Wis., assignor to The Trane Company, La Crosse, Wis., a corporation of Wisconsin
Filed May 7, 1965, Ser. No. 454,107
9 Claims. (Cl. 165—26)

This invention relates to air conditioning units, and particularly to air conditioning units comprising a single heat exchange coil through which a hot or cold fluid may be circulated to provide heating or cooling in a conditioned space.

Heat exchange coils of this type are conventionally connected in systems provided with both a hot and cold water source. The coil is supplied with hot water in the winter and with cold water in the summer. One of the basic shortcomings of such units is that there is no means by which they may furnish heat in the fall and spring and on cool summer days when the system is set for the circulation of cold water. My invention overcomes this shortcoming by the provision of an auxiliary electric heater position adjacent the coil and connected in an electric control circuit in a particularly unique and advantageous way.

The unique features of my control circuit reside in wiring the electric heater in combination with a thermostat and switch means in such a way that the thermostat controls the heating of the conditioned space within the same temperature range whether heat is being furnished by hot water or the electric heater, the circuit being so arranged that the electric heater cannot be energized during the normal heating season when hot water is being circulated to the coil. The control circuit also operates to prevent the circulation of cold water through the coil when the electric heater is energized.

Thus, the primary object of my invention is to provide an electric control circuit for an air conditioning unit comprising a heat exchange coil and an auxiliary electric heater, the control circuit including a thermostat wired so as to control the heating of a conditioned space within the same temperature range whether heat is being furnished by the heat exchange coil or the electric heater.

A further object of my invention is to provide an electric control circuit for a heat exchange coil and electric heater combination wherein the control circuit includes a two stage thermostat, with one stage of the thermostat serving to control the cooling of a space by the heat exchange coil and the other stage of the thermostat functioning to control the heating of the space by either the heat exchange coil or the electric heater.

A third object of my invention is to furnish a thermostatically controlled air conditioning unit as in the preceding object wherein the control circuit contains switch means operative to prevent the energization of the electric heater when hot water is flowing to the coil.

A still further object of my invention is to provide an electric control circuit for an air conditioning unit comprising a heat exchange coil and an auxiliary electric heater, wherein the control circuit includes a two stage thermostat having a first heating control stage and a second cooling control stage, and summer-winter change-over switch means operative in a first position to complete a circuit through either said first or second stage depending upon the temperature sensed by said thermostat, and operative in a second position to open the circuit through said second stage and to close the circuit through said first stage.

These and other objects and advantages of the invention will become readily apparent as the following description is read in conjunction with the accompanying drawings, of which:

FIGURE 1 is a diagrammatic view of a heat exchange coil, auxiliary electric heater combination showing the improved electrical control circuit of my invention with the automatic summer-winter change-over switch in the position for summer operation and the thermostat sensing a predetermined minimum temperature;

FIGURE 2 is a diagrammatic view showing the automatic summer-winter change-over switch of FIGURE 1 in the winter operating position, and the thermostat in a position responsive to a predetermined maximum temperature;

FIGURE 3 illustrates diagrammatically an alternative wiring arrangement for the automatic summer-winter change-over switch; and FIGURE 4 illustrates diagrammatically the connection of a manual, summer-winter change-over switch in the control circuit.

My improved control circuit is particularly adapted for use with an air conditioning unit positioned in a zone to be cooled, and connected to both a hot and cold water supply source. Such a unit 1 is illustrated in FIGURE 1. Heat exchange coil 2 is positioned within a housing 6 having a return air opening 8 and a discharge opening 10. Air is circulated through these openings, over coil 2, and into the conditioned space by means of fan 4 driven by motor 11. The air will normally be heated or cooled, depending upon whether hot or cold fluid is being supplied to the unit from supply pipe 12. The flow of heat exchange fluid to coil 2 through branch supply pipe 14 is controlled by normally closed solenoid valve 16. After passing through coil 2, the heat exchange fluid, normally water, is directed through outlet pipe 18 to main return pipe 20. As will be readily apparent to those skilled in the art, any number of air conditioning units 1 may be positioned in zones to be conditioned, the coils of each of said units being connected to main supply and return pipes 12 and 20 by means of branch inlet and outlet pipes.

In accordance with my invention, an auxiliary electric resistance heater 22 is provided within housing 6 in the air stream of fan 4. Although heater 4 is preferably positioned downstream of coil 2 adjacent outlet 10, it may obviously be placed at any point in housing 6 within the stream of air circulated by fan 4. In lieu of fan 4, a source of primary conditioned air may be injected into housing 6 adjacent inlet opening 8 in order to induce a flow of secondary air from the conditioned space over coil 2. Such an induced air unit is shown in U.S. Patent No. 2,995,078, issued on Aug. 8, 1961, to C. L. Ringquist et al.

The primary purpose of my invention is to control electric heater 22 in coordination with the operation of heat exchange coil 2 in a new and improved manner. To this end I provide a control circuit including two stage thermostat 24 having switch arm 26 movable between a first set of contacts 28 and 30, and switch arm 32 movable between a second set of contacts 34 and 36. The first set of contacts constitutes the heating control stage of the thermostat, which is set to control the heating of he conditioned space within a range of 70° to 72° F. The cooling of the conditioned space is controlled within a range of 74° to 76° F. by the movement of switch arm 32 between contacts 34 and 36, which constitute the cooling control stage. The particular temperature ranges for heating and cooling control are obviously illustrative only, as thermostat 24 may be set for any control limits desired. Switch arm 26 is connected to power supply line L1 by conductor 27, and contact 30 is connected to switch arm 32 by conductor 29. Switch arms 26 and 32 are actuated in response to temperature variations in the conditioned space by any well known temperature responsive means. By way of example, I have shown sensing bulb 46 located in the return air stream and connected by tube 44 to diaphragm case 40 containing flexible diaphragm 42. Operating rod 38 is connected to the underside of diaphragm 42 and attached at spaced points along its length to switch arms 26 and 32. Bulb 46 is filled with an expansible fluid which exerts a varying pressure upon diaphragm 42 in response to fluctuations of the temperature of the air flowing through return opening 8.

Connected to two stage thermostat 24 is a double-pole, double-throw, summer-winter change-over switch 50. The two switch arms 52 and 54 of switch 50 are each movable between a set of 50° F. and 80° F. contacts, which are so labeled to reflect the temperature of the water flowing through supply pipe 12. The two middle 50° and 80° contacts are connected by conductor 56. Switch arm 52 is connected to minimum temperature heating control contact 28, and switch arm 54 is connected to maximum temperature cooling control contact 36. Switch arms 52 and 54 are actuated simultaneously into engagement with either the 50° contacts or the 80° contacts by actuating means responsive to the temperature of the water being circulated through supply pipe 12. The actuating means has been illustrated in the same manner as that provided for thermostat 24. Thus a sensing bulb 58 filled with an expansible fluid is positioned on supply pipe 12 and connected by tube 60 to one side of diaphragm 64 located within diaphragm case 62. Any other type of well known pressure sensing device, such as a bellows assembly, could be employed in place of diaphragms 42 and 64. Operating rod 66 is connected to the opposite side of diaphragm 64, and is attached at spaced points along its length to switch arms 52 and 54.

The 50° F. contact for switch arm 52 is connected to power supply line L2 by way of a circuit including conductor 67, normally closed high temperature limit switch 68 and holding coil 70 of a relay 71 having a contact bar 72. High temperature limit switch 68 is located in the leaving air stream adjacent electric heater 22, and is employed as a safety device to prevent overheating in the event that the fan 4 stalls or thermostat 24 or switch 50 malfunctions. The contact elements for contact bar 72 are located in the circuit of electric heater 22 extending between power lines L1 and L2. Although it is preferred to control electric heater 22 indirectly by means of relay 71, heater 22 could also be operated directly by installing it in the circuit leading from the 50° contact of switch arm 52 to power line L2.

The 50° contact of switch arm 54 is connected to power line L2 by a circuit including conductor 69 and the coil of solenoid valve 16. Electric fan motor 11 is connected across power lines L1 and L2 in the manner shown. The circuit of motor 11 preferably includes speed controller 74 having high, low and off positions.

FIGURE 2 shows summer-winter change-over switch 50 with switch arms 52 and 54 in the position they would assume during winter operation. Thus both of these switch arms are in engagement with their 80° contacts, as they would be when hot water at a temperature of approximately 80° F. is flowing through pipe 12. Also in this view, switch arms 26 and 32 of thermostat 24 are shown positioned against the contacts which they will engage when a predetermined maximum air temperature is sensed by bulb 46.

Switch arms 52 and 54 of the summer-winter change-over switch means may also take the form of two separate single-pole, single-throw switches, rather than forming integral parts of double-pole, double-throw switch 50. In such a case, switch arms 52 and 54 would each be provided with a separate operating rod and interconnected water temperature sensing means. The temperature sensing means would preferably be relatively inexpensive bimetal thermostats fastened to supply pipe 12. With this arrangement, switch arms 52 and 54 and their respective 50° and 80° contacts would be wired into the control circuits in exactly the same manner as is shown in FIGURES 1 and 2. The common actuating means 58-60-64-66 would simply be replaced by the aforementioned separate actuating means connected to each switch arm.

The operation of my control circuit will now be described with reference to FIGURES 1 and 2. During summer operation when cold water at a temperature of about 50° F. is flowing through supply pipe 12 for cooling purposes, switch arms 52 and 54 of summer-winter change-over switch 50 will be moved by operating arm 66 into the position shown in FIGURE 1 in engagement with their respective 50° contacts. Arms 52 and 54 are moved to this position automatically by the flexing action of diaphragm 64 responsive to the relatively low temperature sensed by bulb 58. With switch 50 in this position, a circuit will be completed through either arm 52 and holding coil 70 of relay 71 or arm 54 and solenoid valve 16, depending upon the position of switch arms 26 and 32 of thermostat 24. Thus with bulb 46 sensing the predetermined minimum return air tempareture of 70° F. or less, switch arms 26 and 32 will be in the position shown in solid lines in FIGURE 1. A circuit will thus be completed from power line L1 through conductor 27, switch arm 26, minimum temperature contact 28, switch arm 52 and its 50° contact, conductor 67, high temperature limit switch 68, and holding coil 70 to power line L2. The energization of holding coil 70 will draw contact bar 72 into engagement with its contacts, and the circuit through electric heater element 22 will thus be closed so as to provide a source of heat for the conditioned space. Since switch arm 26 is now in engagement with contact 28 there is no way that a circuit can be completed through contact 30 and switch arms 32 and 54 to solenoid valve 16. Thus the coil of valve 16 will be de-energized, causing the valve to remain closed and prevent the passage of cold water through coil 2 while electric heater 22 is operating.

When the temperature of the return air rises to a level of 72°F., switch arm 26 will be moved into engagement with contact 30 and heater 22 will be de-energized by the opening of relay 71. Through the intermediate return air temperature range of 72° F. to 74° F., switch arms 26 and 32 will be in engagement with contacts 30 and 34 respectively, and neither solenoid valve 16 nor heater element 22 will be energized. Thus neither heating nor cooling will be provided at this time. When the predetermined maximum return air temperature of 76° F. is reached, indicating a need for cooling, operating rod 38 pivots switch arm 32 against maximum temperature contact 36 and arm 26 remains in engagement with contact 30. A circuit will thus be completed from power line L1 through conductor 27, arm 26, contact 30, conductor 29, arm 32, contact 36, switch arm 54 and its 50° contact, conductor 69 and the coil of solenoid valve 16 to power line L2. Valve 16 will be opened and chilled water will flow through coil 2 to produce the desired cooling effect.

In the winter, bulb 58 will sense the flow of hot water, at a temperature of 80° F. for example, through supply pipe 12, and the resulting increased pressure on diaphragm 64 will flex it so as to move operating rod 66 and switch arms 52 and 54 to the position shown in FIGURE 2. Switch arms 52 and 54 will now be in engagement with their respective 80° contacts. It will be seen that with switch arm 54 engaging its open 80° contact, the circuit through this switch and switch arm 32 of thermostat 24 will be open and inoperative, even with switch 32 in the maximum temperature position of FIGURE 2. Control during the winter heating cycle is thus achieved solely by the operation of thermostatic switch arm 26. With the return air at a temperature of 72° F. or higher, switch arm 26 will be against contact 30 as shown in FIGURE 2. When the return air temperature drops to the 70° F. set point, operating arm 38 will pivot switch arm 26 against contact 28. A circuit will then be completed from power line L1 through conductor 27, switch arm 26, minimum temperature contact 28, switch arm 52 and its 80° F. contact, conductor 56, and the 50° contact to which it is connected, conductor 69 and the coil of solenoid valve 16 to power line L2. The energization of solenoid valve 16 causes it to open and permit the flow of hot water into coil 2 for heating purposes. It is to be noted that with switch arm 52 engaging its 80° contact, the circuit through relay 70 cannot be closed, and thus electric heater 22 will never be energized during the normal heating season when hot water is circulating through supply line 12.

FIGURE 3 illustrates an alternative scheme for wiring double-pole, double-throw switch 50. Water temperature responsive switch 50 functions in the control circuit in exactly the same manner as described above with respect to FIGURES 1 and 2. The wiring of the switch has merely been changed to accomplish the same result in a different way. Thus the conductor from contact 36 of thermostat 24 is connected to the 50° contact of switch arm 54 rather than directly to the switch arm. The 80° contact of switch arm 54 is connected by conductor 80 to the pivot contact of switch arm 52, and switch arm 54 is directly connected to conductor 69 leading to solenoid valve 16. It will readily be seen that this wiring arrangement permits switch 50 to control the operation of electric heater 22 and solenoid valve 16 in the same way as does the wiring scheme of FIGURES 1 and 2. Thus with switch arms 52 and 54 engaging their 50° contacts in the positions shown in solid lines, a circuit will be completed either through contact 28, arm 52 and conductor 67 to holding coil 70 or through contact 36, arm 54, and conductor 69 to solenoid valve 16 depending upon the need for heating or cooling as sensed by bulb 46. When hot water is being supplied through pipe 12 and switches 52 and 54 are against their 80° contacts in the positions shown in dotted lines, switch 54 will be ineffective to complete the circuit from contact 36 through conductor 69 to solenoid valve 16. As with the arrangement shown in FIGURE 2, solenoid valve 16 will be energized to supply hot water to coil 2 during winter operation only when the return air temperature drops to 70° F. and switch arm 26 engages contact 28. At this time a circuit will be completed from power line L1 through conductor 27, switch 26, the pivot contact of switch arm 52, conductor 80, switch arm 54 and conductor 69 to the coil of solenoid valve 16.

Switch 50 may also be operated manually, rather than automatically in response to the temperature of the water flowing through supply pipe 12. In this case, water temperature responsive bulb 58, diaphragm case 62 and operating rod 66 would simply be eliminated. Such an arrangement is shown in FIGURE 4. Double-pole, double-throw switch 50 is of exactly the same construction as shown in FIGURE 1. As is clearly indicated in FIGURE 4, switch arms 52 and 54 and their 50° and 80° contacts are wired into the control circuit in exactly the same manner as is the automatic switch of FIGURES 1 and 2. Thus switch 50 will function in exactly the same way as described above with respect to FIGURES 1 and 2. The only difference is that switch arms 52 and 54 are moved back and forth between their respective 50° and 80° contacts manually whenever the system of which air conditioning unit 1 is a part is changed over from summer (chilled water) to winter (hot water) operation and vice versa.

On the basis of the foregoing discussion, it will be readily apparent that my unique control circuit permits the utilization of an auxiliary electric heater in conjunction with the heat exchange coil of an air conditioning unit so as to provide improved heating and cooling control. My particular summer-winter change-over switch and thermostat arrangement achieves the new and improved result of controlling the heating of a conditioned space within the same temperature range whether heat is being supplied by the heat exchange coil or the auxiliary electric heater. This desirable result is achieved while at the same time preventing the electric heater from being energized when hot water is flowing to the coil during the normal heating season. The electric heater is made available as a source of heat only during the normal cooling season (central system changed over to chilled water supply) when the temperature of the conditioned space goes below a predetermined minimum level.

I do not desire to limit my invention to the particular embodiments shown and described, which are illustrative only. It is contemplated that changes may be made without departing from the spirit and scope of the invention as defined by the following claims.

I claim:

1. In combination with air conditioning apparatus comprising a heat exchange coil and an electric heating element located in a space to be air conditioned, improved control means comprising: a thermostat responsive to the temperature in the conditioned space and having a minimum temperature heating control contact and a maximum temperature cooling control contact; electrically operable valve means in a fluid supply conduit connected to said heat exchange coil; switch means electrically connected to said heating and cooling control contacts and movable between first and second positions; a first circuit through said heating control contact and said switch means serving to energize said electric heating element; a second circuit through said heating control contact, said switch means and said electrically operable valve means; a third circuit through said cooling control contact, said switch means and said electrically operable valve means; said switch means being operative in said first position to complete either said first circuit or said third circuit depending upon the temperature sensed by said thermostat, and operative in said second position to open said first circuit and to close said second circuit.

2. Apparatus as recited in claim 1 and further including temperature sensing means responsive to the temperature of the fluid flowing through said fluid supply conduit and operably connected to said switch means, whereby said switch means is automatically actuated between said first and second positions in response to the temperature of the fluid in said fluid supply conduit.

3. Apparatus as recited in claim 1 wherein said switch means is so connected in said third circuit that said third circuit is open when said switch means is said second position.

4. Air conditioning apparatus comprising in combination; a heat exchange coil and an electric heating element positioned in a space to be air conditioned, a fluid supply conduit connected to said coil, and improved means for controlling the operation of said coil and said electric heating element comprising: a thermostat having a temperature sensing element positioned so as to sense the temperature in the conditioned space, said thermostat having first and second switch means, said first switch means being operative in response to impulses from said sensing element to control the heating of said conditioned space, and said second switch means being operative in response to impulses from said sensing element to control the cooling of said conditioned space; electrically operable valve means in said fluid supply conduit, said electric heating element and said electrically operable valve means being positioned in separate electrical circuits; summer-winter change-over switch means electrically connected to said first and second switch means and movable between a first summer operation position and a second winter operation position; a first circuit through said first switch means and said summer-winter switch means serving to energize said electric heating element; a second circuit through said first switch means, said summer-winter switch means and said electrically operable valve means; said summer-winter switch means being operative in said first position to complete said first circuit, and operative in said second position to complete said second circuit.

5. Apparatus as recited in claim 4 wherein said summer-winter switch means is so connected in said first and second circuits that said first circuit is open when said summer-winter switch means is in said second position.

6. Apparatus as recited in claim 4 and further including a third circuit through said second switch means, said summer-winter switch means and said electrically operable valve means, said summer-winter switch means also being operative in said first position to complete said third circuit, the completion of either said first circuit or said third circuit when said summer-winter switch means is in said first position being determined by the position to which said first and second switch means are actuated by said temperature sensing element.

7. Air conditioning apparatus comprising in combination; a heat exchange coil and an electric heating element positioned in a space to be air conditioned, a fluid supply conduit connected to said coil, and improved means for controlling the operation of said coil and said electric heating element comprising: a thermostat responsive to the temperature in the conditioned space and having a minimum temperature heating control contact and a maximum temperature cooling control contact; electrically operable valve means in said fluid supply conduit; summer-winter change-over switch means having a first switch arm connected to said heating control contact and a second switch arm connected to said cooling control contact, said switch arms being simultaneously movable between a first summer operation position and a second winter operation position; a first circuit through said heating control contact and said first switch arm serving to energize said electric heating element; a second circuit through said heating control contact, said first switch arm and said electrically operable valve means; a third circuit through said cooling control contact, said second switch arm, and said electrically operable valve means; said switch arms being operative in said first position to complete either said first circuit or said third circuit depending upon the need for heating or cooling as sensed by said thermostat.

8. Apparatus as recited in claim 7 wherein said first switch arm is operative in said second position to open said first circuit and to close said second circuit.

9. Apparatus as recited in claim 7 wherein said second switch arm is operative in said second position to open said third circuit.

References Cited by the Examiner

UNITED STATES PATENTS

| | | | |
|---|---|---|---|
| 2,468,626 | 4/1949 | Graham | 165—28 |
| 2,847,190 | 8/1958 | Slattery et al. | 165—17 |

ROBERT A. O'LEARY, *Primary Examiner.*

CHARLES SUKALO, *Examiner.*